United States Patent
Wilson

(10) Patent No.: US 6,710,635 B1
(45) Date of Patent: Mar. 23, 2004

(54) FREQUENCY AND PHASE LOCKED LOOP

(75) Inventor: Dennis L. Wilson, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/345,910

(22) Filed: Jan. 16, 2003

(51) Int. Cl.[7] .............................................. H03B 19/00
(52) U.S. Cl. ...................................... 327/156; 327/113
(58) Field of Search ................................. 327/156, 158, 327/159, 105, 113; 375/327, 375

(56) References Cited

U.S. PATENT DOCUMENTS 6,493,409 B1 * 12/2002 Lin et al. .................... 375/375
6,539,068 B2 * 3/2003 Hebron et al. ............... 375/346
6,597,725 B1 * 7/2003 Ishil ............................ 375/136

* cited by examiner

*Primary Examiner*—Dinh T. Le
(74) *Attorney, Agent, or Firm*—Kenneth W. Float

(57) ABSTRACT

A frequency and phase locked loop having improved performance. The loop measures both frequency and phase of a modulated signal to supply a carrier for demodulation of a quadrature amplitude modulated signal (QAM) signal and for many other applications. The addition of the frequency measurement and the use of finite impulse response filters instead of infinite impulse response filters of a phase locked loop permit the loop to lock to the carrier much more rapidly and with a larger offset.

11 Claims, 2 Drawing Sheets

FREQUENCY AND PHASE LOCKED LOOP

BACKGROUND

The present invention relates generally to communication systems, and more particularly, to improved frequency and phase locked loops for acquiring a carrier of a communication signal by measuring both phase and frequency.

Phase locked loops have been used for many years to provide a carrier reference for demodulation of a signal. In particular quadrature amplitude modulated (QAM) signals have used the phase locked loops to generate a carrier to extract the in-phase and quadrature components of a signal to demodulate the data signals that are contained in the signal.

The structure of a typical conventional phase locked loop used in a demodulator is shown in FIG. 1. The phase locked loop shown in FIG. 1 is a second-order phase locked loop that is able to adjust the phase of an input signal to remove any bias in the phase of the signal as it comes from the demodulator.

The conventional phase locked loop can be modeled as an infinite impulse response filter. A control loop measures the error signal, the output of the phase detector, and feeds that error signal back to correct the phase of the carrier used for demodulation. The use of the integrator makes the loop a second order loop with advantages in the operation of the circuit. A text by Floyd Gardner, entitled "Phase lock Techniques," published by Wiley and Sons, NY, 1979 provides for a more complete discussion of phase locked loops.

The integrator forms the integral of the phase, the frequency of the error signal to be used in the correction of the carrier used in the demodulation.

Other forms of phase locked loops also form control loops that control the phase and frequency of a numerically controlled oscillator or voltage controlled oscillator used to lock to the carrier of the signal being demodulated.

The phase locked loop has problems when the initial frequency of the oscillator is not near to the frequency of the signal. The loop must "hunt" for the frequency of the signal. If the frequency of the signal is too far from the initial frequency of the oscillator, the loop will fail to lock.

The bandwidth of the loop may be increased by decreasing the gain of the loop to increase the acquisition bandwidth of the loop. The increase in the bandwidth allows more noise in the loop, increasing the phase error of the loop and contributing to errors in demodulation of the signal.

It is an objective of the present invention to provide for improved frequency and phase locked loops that acquire a carrier of a communication signal by measuring both phase and frequency.

SUMMARY OF THE INVENTION

To meet the above and other objectives, the present invention provides for improved frequency and phase locked loops that are well adapted for use in communication systems. The frequency and phase locked loops are used to acquire a carrier of a communication signal by measuring both phase and frequency.

The present invention provides for the measurement of both frequency and phase error during carrier acquisition of a communication signal. The measurement uses a finite impulse response (FIR) filter as well as the usual feedback loop in the processing. The present invention is able to acquire the carrier signal much more quickly with less phase noise in the demodulation of the signal compared to conventional techniques.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
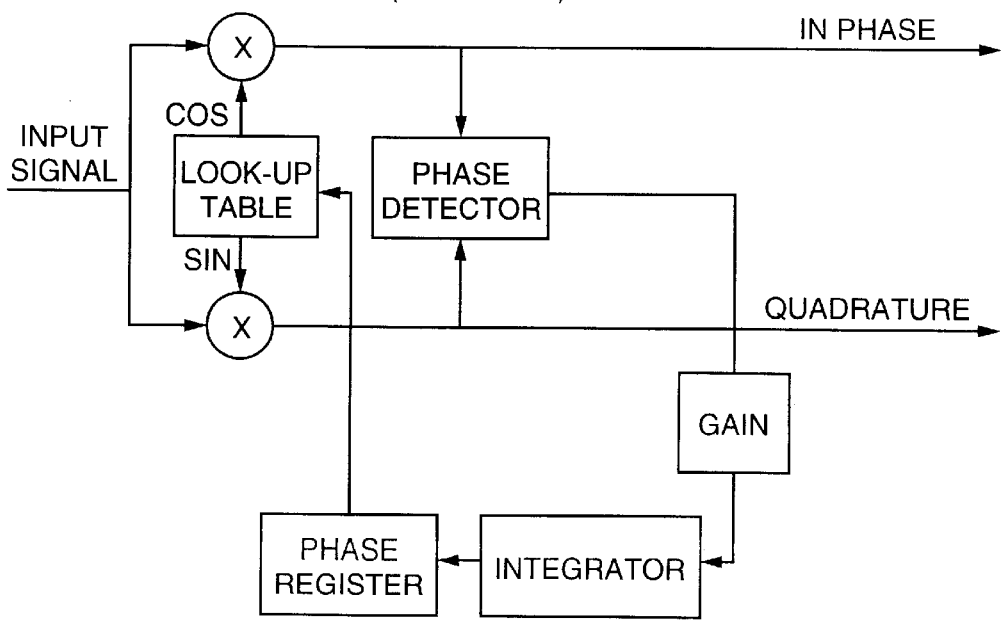
FIG. 1 illustrates an exemplary conventional phase locked loop used in a demodulator.
Figure 2:
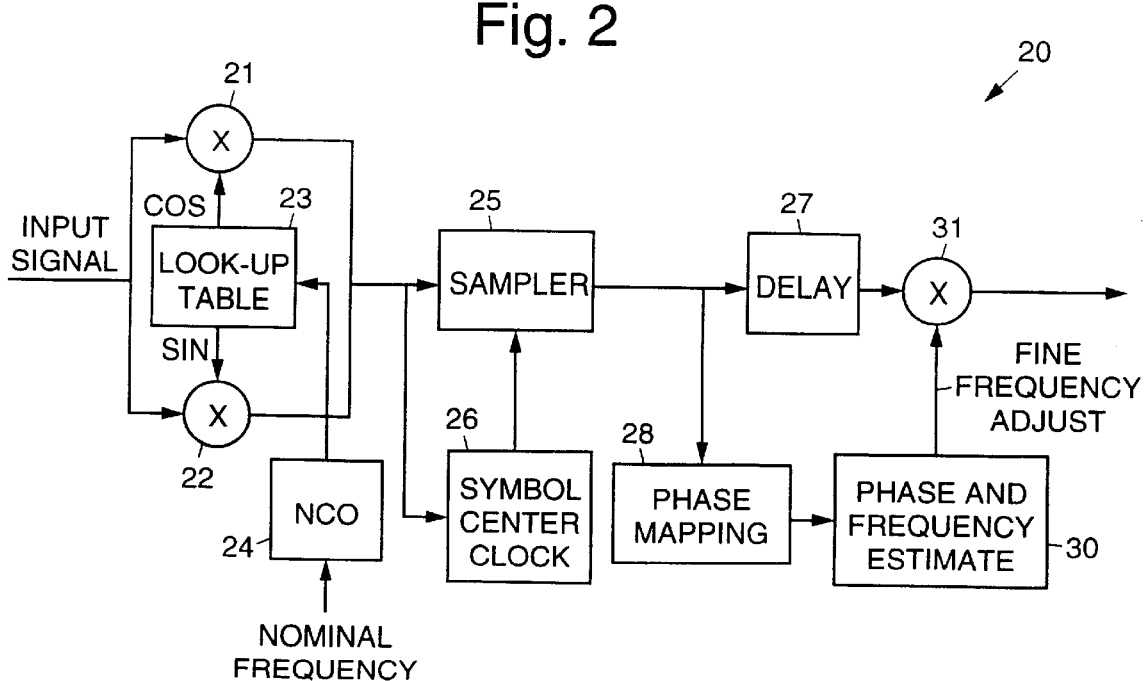
FIG. 2 illustrates the architecture of an exemplary frequency and phase locked loop in accordance with the principles of the present invention.

Referring now to FIG. 2, it illustrates the architecture of an exemplary frequency and phase locked loop 20 or processor 20 in accordance with the principles of the present invention. The present invention provides for a frequency and phase locked loop 20 that implements a new technique for carrier acquisition that uses a measure of phase and a measure of frequency. The technique embodied in the present invention is a finite impulse response filter technique for measuring the parameters of a carrier for a communication signal.

The loop 20 starts by shifting the frequency of an input signal to baseband by multiplying 21, 22 by the cosine and sine of a frequency generated by a look-up table 23 coupled to a numerical controlled oscillator 24 that is near to the correct frequency of the input signal. The product yields the in-phase and quadrature components of the signal for further processing.

The in-phase and quadrature components of the signal are input to a symbol center clock 26 that drives a sampler 25 that samples the in-phase and quadrature components of the signal. The output of the sampler 25 is delayed 27 and input to a first input of a mixer 31. The output of the sampler 25 is also phase mapped 28 and processed to generate a phase and frequency estimate 30 which generates a fine frequency adjustment signal that is input to a second input of the mixer 31. The output of the mixer 31 is a phase locked signal.

Figure 3:
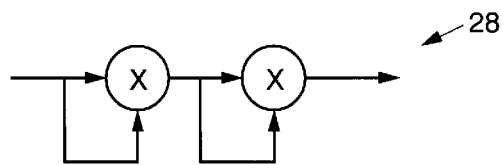
FIG. 3 illustrates details regarding phase mapping of the signal in the exemplary frequency and phase locked loop shown in FIG. 2.

FIG. 3 illustrates phase mapping 28 of the input signal. The phase mapping 28 raises the complex input signal to the fourth power by squaring then squaring again. The function of the phase mapping 28 is to map the quadrant from −45 degrees to +45 degrees to a full +/−180 degrees. The phase shifts of the quadrature amplitude modulation are removed, yielding a carrier signal that can move through a full 360 degrees. In applications where the carrier is generated in another way, the phase mapping 28 need not be used.

Figure 4:
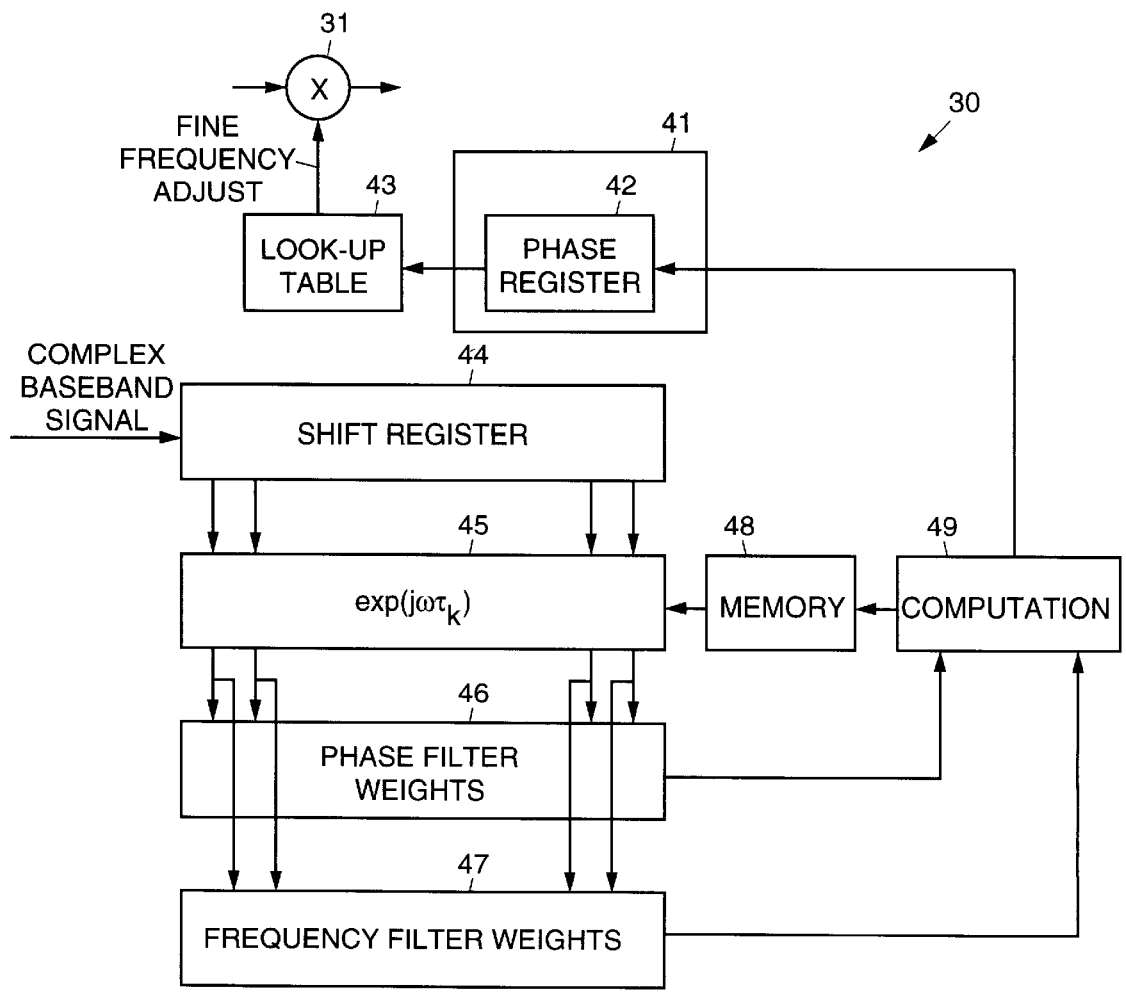
FIG. 4 illustrates details regarding the phase and frequency estimate performed in the exemplary frequency and phase locked loop shown in FIG. 2.

FIG. 4 illustrates details of the phase and frequency estimate 30. The phase and frequency estimates 30 are implemented using modified finite impulse response (FIR) filters.

The first step in the estimation of phase and frequency is to push (input) the sampled complex baseband signal into a shift register 44. The each stage of the shift register 44 is used to supply a sample to a weighting function as is done in finite impulse response (FIR) filters. The departure from simple FIR filtering is the insertion of an intermediate phase shift stage 45 where the samples are phase shifted by an amount proportional to the spacing along the shift register 44. That is, each stage of the shift register 44 is shifted by an amount equal to $$\exp(j\omega\tau_k)$$

where $\tau_k$ ranges from $-T/2$ to $T/2$ as k ranges from 1 to N, and where N is the number of stages in the shift register 44.

This function, in effect shifts the frequency of the complex baseband signal in the shift register 44 by an amount $$\omega = 2*\pi*f$$

where the frequency is measured in terms of cycles per sample.

The two weighting functions 46, 47 for the phase and the frequency are the usual weighting functions for a FIR filter. The weights are real, while the phase shifted complex baseband signals from the shift register 44 are complex with in-phase and quadrature components as discussed above.

The nominal weighting function for phase is a constant. That is, the phase filter 46 measures the average value of the frequency shifted samples from the shift register 44.

$$WT_{phase}(k) = \text{const.}$$

The nominal weighting function for frequency is a signal proportional to the tap number in the shift register 44.

$$WT_{freq}(k) = k-N/2 \text{ for N even and } k-(N+1)/2 \text{ for } N \text{ odd}$$

where k is the number of the tap of the shift register 44 and N is the number of taps in the shift register 44.

The frequency weights go from $-N/2$ to $+N/2$ as the number of taps goes from 1 to N.

It is convenient if the number of taps in the shift register 44 is odd. In this case the frequency weights 47 go from $-(N+1)/2$ to $(N+1)2$.

A variation of these weights applies a window function to the phase and frequency weights. A typical window function that might be used is a Kaiser window. A discussion of windows may be found in a text by T. Parks and C. Burrus, entitled "Digital Filter Design," published by Wiley and Sons, NY, 1987.

The phase and frequency computation 49 takes a number from the phase filter 46 and a number from the frequency filter 47 and calculates a number for a phase register 42 that is used in the numerically controlled oscillator (NCO) 41 to generate the mixing signal to shift the input signal to precisely the carrier frequency of the signal. The output of the phase register 42 is input to the look-up table 43 that generates the fine frequency adjustment signal that is input to the mixer 31. The output of the mixer 31 is a signal that is phase locked, so that demodulation of the signal can proceed.

The computation 49 starts with the complex phase number from the phase filter 46 and calculating its magnitude:

Magnitude=sqrt(Phase*conjugate(Phase)).

The reciprocal of this magnitude is calculated for purposes of normalizing the results:

Reciprocal Phase Magnitude=1/Magnitude.

The phase number is adjusted to have a magnitude of one:

Normalized Phase=Phase*Reciprocal Phase Magnitude

The output of the frequency filter 47 is a complex number that is phase shifted in accordance with the normalized phase and has the magnitude normalized in accordance with the measured amplitude of the phase signal.

Normalized Frequency =Gain*Frequency*conjugate(Normalized Phase) *Reciprocal Phase Magnitude.

The gain is adjusted by a calibration procedure so that the result measures the frequency of the offset of the frequency of the signal after the original frequency shift.

The next frequency is set:

Control Frequency(k)=Control Frequency(k−1)+ GainF*imag(Normalized Frequency)

where imag( ) indicates the imaginary part of the complex value.

The phase register value that is used to set the mixing value for the next sample is:

Phase Register(k)=Phase Register(k−1)+ 0.25*(GainP*imag(Normalized Phase)−2*π*Control Frequency(k−1).

The gains, GainF and GainP, are used to adjust the time constant of the response to the measurements of the frequency and phase error. The constant 0.25 adjusts for the fact that the frequency has been multiplied by a factor of four in the phase mapping stage of the processing.

The control frequency is used to control the selection of a set of values of the frequency shift of the processing. The frequency shift operation, multiplying the samples from the shift register 44 by $\exp(j\omega\tau k)$, has values that depend on the frequency used in the shift operation. The values for a particular frequency can be preloaded into a memory 48, then selected for the frequency shift operation by using the control frequency as an index to retrieve the values for multiplication.

The phase register 44 value is used with a look-up table (LUT) 43 to retrieve the appropriate cosine and sine values for the mixing operation 31.

The estimate of the phase and frequency apply to the signal that is at the center of the shift register 44. This signal has been delayed by one half the shift register length. By inserting a delay 27 in the signal before the mixer 31 that shifts the frequency and phase of the carrier, the adjustment to the phase and frequency can be made to match the signal. The demodulation of the signal can start with the first symbol of the signal, not waiting for the phase locked loop to lock, as is the case for a traditional phase locked loop.

The frequency and phase locked loop 20 has two parameters that control its operation, the length of the shift register 44 used in the basic filtering operation and the gains, GainF and GainP, used to modify the values of the frequency and phase in the operation. As the length of the shift register 44 is made longer, the accuracy of the estimation of the phase and frequency is more accurate. The accuracy of the estimate of the frequency error improves as $N^{3/2}$. The gains, GainF and GainP adjust the time constant of the correction for the errors in phase and frequency measured by the phase and frequency filters 46, 47.

With these two controls, the operation of the frequency and phase lock loop 20 can be adjusted to achieve the desired phase error for a given signal to noise ratio and the speed of acquisition of the carrier desired. If GainF and GainP are equal to 1.0, the speed of acquisition is as rapid as possible and is equal to a number of samples equal to half the length of the shift register. If the GainF and GainP are set equal to 1/(N/2), the speed of acquisition and the speed of correction of the errors in frequency and phase is balanced. If GainF and GainP are much less than 1/(N/2), the phase error will be reduced at the cost of an increased acquisition time.

The processing requires one complex filtering operation and two real filtering operations operating on complex values fed into the shift register 44. For short shift registers 44, from 5 to 15 stages long, for example, the number of computations is on the order of 8*N or 8*15 =120 multiply-adds for a shift register that is 15 stages long. The implementation of processing with 15 to 120 multiply-adds in one field programmable gate array or ASIC is well within the state of the art. The multipliers can operate with multiply rate up to 100 megaHertz is many implementations. This suggests that data rates on the order of 50 mega-symbols per second can be handled by such a processor 20.

Variations of the present invention will now be discussed. Simplifications of the processor 20 can be made at some cost in performance. The simplest version of the processor 20 is one with three taps in the shift register 44. A longer shift register 44 may be made into a three tap equivalent shift register 44 by dividing the shift register 44 into two parts. The values of the samples in each half of the register 44 are added to form an average signal in that half of the register 44. The phase value is the sum of the two values while the frequency value is the difference between the two values. For this approach, it is convenient if the shift register 44 has an even number of stages.

This simplification will reduce the frequency acquisition range of the processor 20. It will reduce the number of multiplies and adds to three for frequency shift, the phase filter 46, and the frequency filter 47 of the processor 20, much less than the full computation rate required for a shift register 44 with more stages.

Thus, the frequency and phase locked processor 20 implemented in accordance with the present invention measures both the phase error and the frequency error in a communication receiver using finite impulse response filters, as contrasted to a conventional phase locked loop that measures only the phase error and uses the measured phase error to adjust the frequency and the phase for carrier lock.

The result of measuring both the phase error and the frequency error is a very much more rapid acquisition of the carrier. In particular, the frequency of the carrier can be acquired in a number of samples that is one half the length of the shift register 44 used in the implementation.

By delaying the input signal, the carrier can be demodulated from the first samples of the signal.

Thus improved frequency and phase locked loops or processors for acquiring a carrier of a communication signal by measuring both phase and frequency has been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A frequency and phase locked loop for processing an input signal to generate a phase and frequency locked output signal, comprising:

apparatus for shifting the frequency of the input signal to baseband to produce in-phase and quadrature components of the input signal;

apparatus for sampling the in-phase and quadrature components of the input signal;

delay apparatus for delaying the sample;

phase and frequency estimate apparatus comprising a finite impulse response filter for measuring and processing the phase and frequency of the sample to generate a fine frequency adjustment signal; and a mixer coupled to the delay apparatus and phase and frequency estimate apparatus for mixing the delayed sample with the fine frequency adjustment signal to generate phase and frequency locked output signal.

2. The frequency and phase locked loop recited in claim 1 wherein the apparatus for shifting the frequency of the input signal to baseband comprises:

a numerical controlled oscillator;

a look-up table coupled to the numerical controlled oscillator; and first and second multipliers coupled to the look-up table.

3. The frequency and phase locked loop recited in claim 1 wherein the apparatus of shifting complex a shift register wherein each stage of the shift register is shifted by an amount equal to $\exp(j\omega\tau_k)$, where $\tau_k$ ranges from T/2 as k ranges from 1 to N, and where N is the number of stages in the shift register and T is a period.

4. The frequency and phase locked loop recited in claim 1 wherein the phase shift apparatus shifts the frequency of the baseband signal in the shift register by an amount $\omega=2*\tau*f$, where the frequency is measured in terms of cycles per sample.

5. The frequency and phase locked loop recited in claim 1 wherein the phase and frequency estimate apparatus comprises:

a shift register for shifting the sample;

phase shift apparatus for phase shifting the sample by an amount proportional to the length of the shift register;

phase and frequency weighting functions for weighting the phase and frequency, respectively, of the sample;

computation apparatus coupled to the phase and frequency weighting functions for calculating an adjustment number;

a numerically controlled oscillator coupled to the computation apparatus that adjusts its output frequency in response to the adjustment number; and a look-up table coupled to the numerically controlled oscillator that generates fine frequency adjustment signal in response to the output frequency of the numerically controlled oscillator.

6. The frequency and phase locked loop recited in claim 1 further comprising:

phase mapping apparatus for phase mapping the sample and inputting it to the phase and frequency estimate apparatus.

7. The frequency and phase locked loop recited in claim 6 wherein the phase mapping apparatus raises the input signal to the fourth power.

8. The frequency and phase locked loop recited in claim 1 wherein the phase mapping apparatus maps a quadrant of the input signal from −45 degrees to +45 degrees to a full +/−180 degrees.

9. The frequency and locked loop recited in claim 5 wherein the nominal weighting function for phase is a constant.

10. The frequency and phase locked loop recited in claim 5 wherein the filter measures the average value of the frequency shifted samples from the shift register.

11. The frequency and phase locked loop recited in claim 5 wherein the weights of the phase and frequency weighting functions applies a window function to the phase and frequency weights.

* * * * *